Dec. 10, 1929.    P. M. FREER    1,739,221
PISTON
Filed Jan. 14, 1929    2 Sheets-Sheet 1
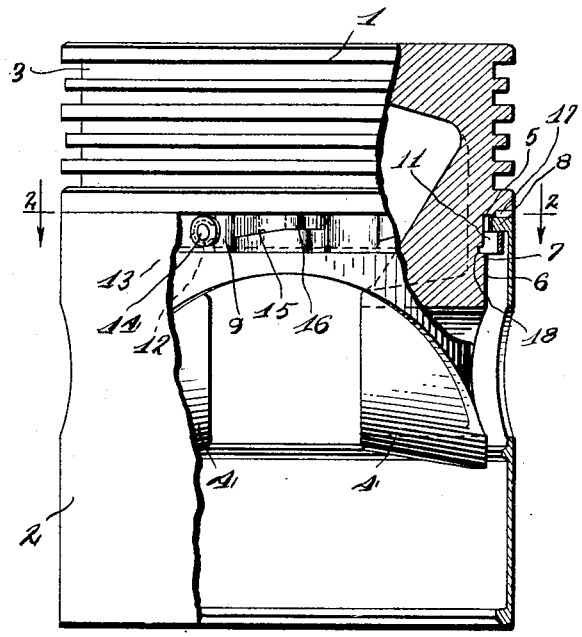
Fig. 1.
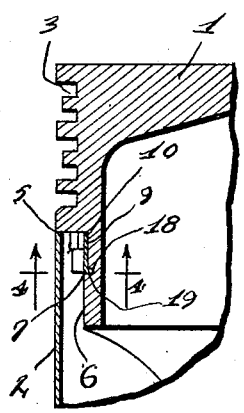
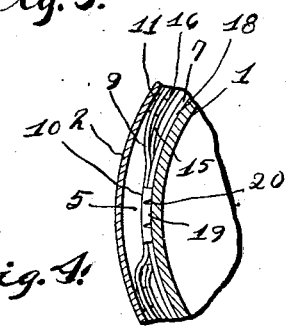
Fig. 3.
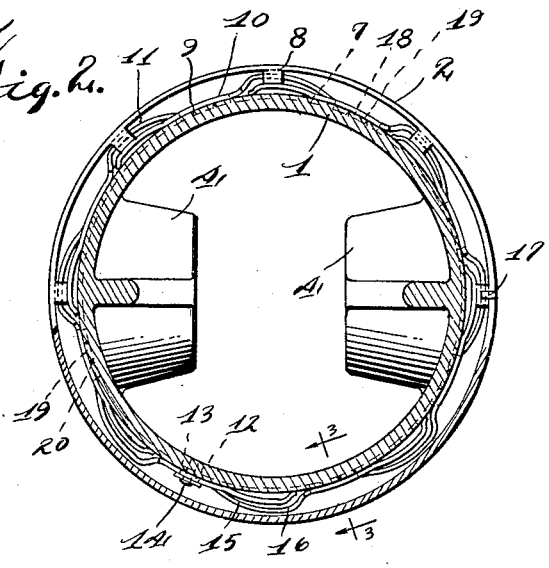
Fig. 2.
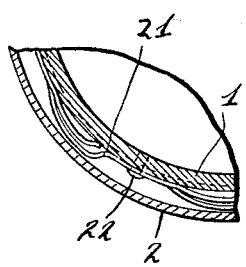
Fig. 5.
INVENTOR
Phelps M. Freer
BY
Whittemore Hulbert Whittemore Belknap
ATTORNEYS Dec. 10, 1929. P. M. FREER 1,739,221
PISTON
Filed Jan. 14, 1929 2 Sheets-Sheet 2

INVENTOR
Phelps M. Freer
BY
Whittemore Hulbert Whittemore Belknap
ATTORNEYS

Patented Dec. 10, 1929

1,739,221

UNITED STATES PATENT OFFICE

PHELPS M. FREER, OF DETROIT, MICHIGAN

PISTON

Application filed January 14, 1929. Serial No. 332,534.

The invention relates to pistons and refers more particularly to composite pistons. The invention has for one of its objects the provision of a composite piston having its head secured to its skirt by means having a cam engagement with one of the members. Another object is to so construct the cam member that it may be readily manufactured and that it will efficiently operate in securing the head and skirt to each other. Further objects of the invention reside in the novel features of construction and combinations and arrangements of parts as more fully hereinafter set forth.

In the drawings:—

Figure 1 is an elevation, partly in section, of a piston embodying my invention;

Figure 2 is a cross section on the line 2—2 of Figure 1;

Figure 3 is a cross section on the line 3—3 of Figure 2;

Figure 4 is a cross section on the line 4—4 of Figure 3;

Figure 5 is a view similar to a portion of Figure 2, showing a modified construction of cam member;

Figures 6, 8:
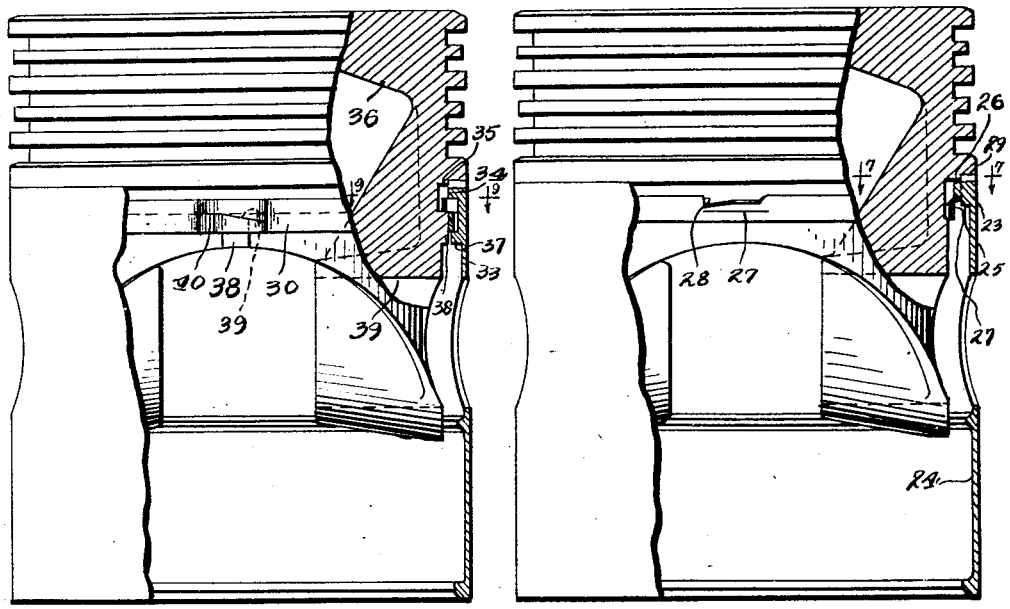
Figure 6 is a view similar to Figure 1, showing a modified piston.
Figure 8 is a view similar to Figure 1, showing a modified construction.

In general, the piston comprises the head 1 and the skirt 2. The head is preferably formed of aluminum and the skirt is preferably formed of iron, the latter being adapted for engagement with the wall of the cylinder in which the piston operates and the former being preferably out of engagement with the wall of the cylinder. The head has the annular grooves 3 for engagement with the piston rings and the pair of diametrically opposite hubs 4 for receiving the wrist pin connecting the connecting rod to the piston. The head has the annular shoulder 5 and the annular outwardly extending flange 6 presenting the annular shoulder 7 opposed to the annular shoulder 5. The skirt surrounds the hubs and the lower portion of the head, including the outwardly extending annular flange, and is spaced laterally therefrom and is provided with the inwardly extending flange 8 for abutting the annular shoulder 5.

For securing the head and skirt of the piston shown in Figures 1 to 4 inclusive, I have provided the sheet metal undulate ring 9, which is preferably formed of spring steel or bronze. This ring has alternate troughs and crests 10 and 11, respectively, with the crests extending outwardly from the troughs. This ring is preferably transversely split at one of the troughs 10, one of its ends having an extension of reduced width providing the neck 12 and the head 13 and the other end having a slot formed therein corresponding in size and shape to the neck 12 and the head 13. The arrangement is such that when these ends are in abutting relation they are held from peripheral separation. The lower edges of the troughs are adapted to abut the annular shoulder 7 and the ring is held from rotation upon the piston head 1 by means of the screw 14 extending through the head 13 and threaded into the piston head. With this arrangement the screw holds the ends of the ring from peripheral separation, as well as holds the ring from rotation relative to the piston head.

The crests 11 are peripherally split at 15 with the splits inclined so that the upper edges of the lower parts of the crests are cam or wedge shaped. The upper parts of the crests are transversely severed at 16 with the adjacent ends separated. The inwardly extending flange 8 of the skirt is peripherally interrupted to, in effect, provide projections of a width to pass through the troughs of the ring 9 when assembling the skirt 2 upon the head 1, the ring 9 already having been secured in place upon the head and under tension. The lower edges of these projections are preferably correspondingly inclined to the upper edges of the lower parts of the crests 11 so that after the skirt has been brought into approximate position relative to the shoulder 5 of the head, rotation of this skirt causes the projections to ride up on the cam edges of the lower parts of the crests to bring the flange 8 of the skirt into tight engagement with the shoulder 5 of the head. During this rotation the projections of the flange 8 cam the upper parts of the crests inwardly and move their ends into contact with the head 1, which parts as a result tend to resiliently center the skirt upon the head. By reason of this construction, expansion of the head is provided for by the ring, which is both undulate and resilient For securing the head and skirt in operative position, I provide the pin 17 extending radially into the portion of the head forming the shoulder 5 and the flange 8 of the skirt. For the purpose of providing a more extended bearing of the ring 9 upon the head 1, the latter is preferably provided with the annular groove 18, the lower face of which registers with the annular flange 7. The ring 9 has at the lower edges of its troughs the transverse flanges 19, which extend into this annular groove and are preferably notched at 20 to provide for flexing of the ring.

In the modification shown in Figure 5, the ring 21 differs from the ring 9 in being continuous instead of transversely split. In this modification the ring is held from rotation relative to the piston head by means of a pin 22 extending radially through a trough of the ring and into the head. This ring is expanded to assemble the same upon the head and is under tension when assembled.

Figures 7, 9:
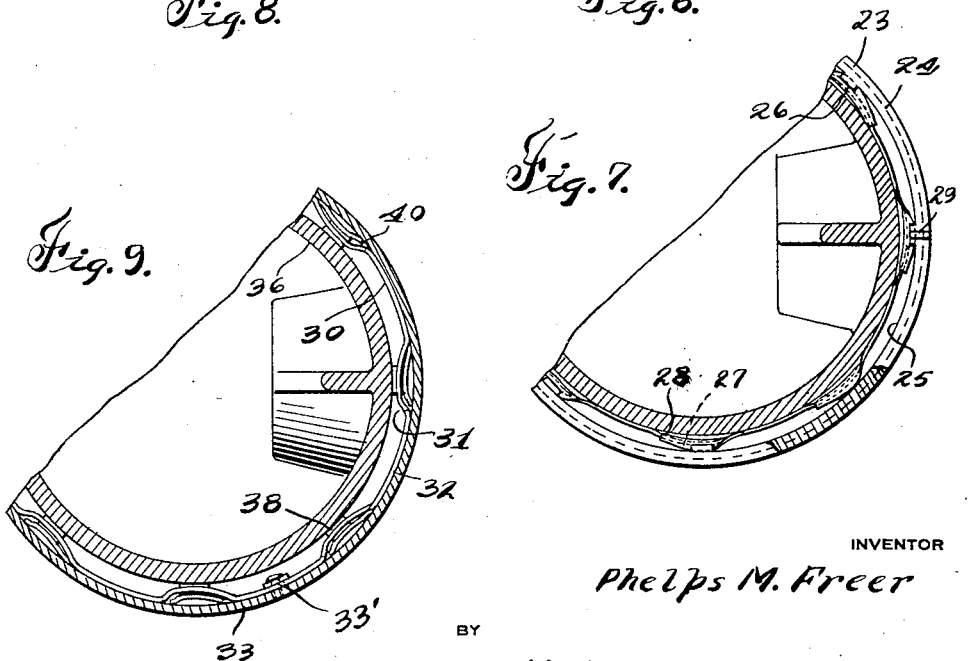
Figure 7 is a cross section on the line 7—7 of Figure 6.
Figure 9 is a cross section on the line 9—9 of Figure 8.

In the modification shown in Figures 6 and 7, the flange 23 of the skirt 24 has the stepped portions 25 and 26 with the latter peripherally interrupted. The ring is peripherally undulate, as in the modification shown in Figures 1 to 4, but the crests of this ring are peripherally severed at 27 and the upper parts of the crests are transversely severed at 28 and twisted or bent over with the upper surfaces inclined or cam shaped and the lower edges moved out of the planes of the lower parts of the crests. The skirt is assembled with the head and ring in the same manner as previously described by passing the interrupted stepped portion 26 upwardly through the troughs of the ring, after which the skirt is rotated so that the lower edges of the interrupted stepped portion 26 ride up on the upper parts of the crests, the outer edges of these upper parts abutting the inner wall of the stepped portion 25. The skirt is preferably secured to the head to be held from rotation relative thereto by means of the radially extending pin 29 engaging both the head and skirt in the same manner as the pin 17. With this latter modification, it will be seen that the ring, in addition to firmly holding the head and skirt together, yieldably centers the skirt upon the head.

In the modification shown in Figures 8 and 9, the cam ring 30 is the reverse of the cam ring 9 shown in Figures 1 to 4, inclusive. The crests 31 of the ring 30 extend inwardly instead of outwardly, the troughs 32 being in engagement with the skirt 33. One of these troughs is preferably transversely split in the same manner as the ring 9 and its ends are secured together and to the skirt by the screw 33'. The skirt is formed at its upper edge with the inwardly extending flange 34 for abutting the annular shoulder 35 upon the head 36. The skirt is also formed with the inwardly extending annular flange 37 spaced from the flange 34 and adapted to abut the lower edges of the troughs 32 of the ring. The head 36 is formed with the outwardly extending flange 38 which is interrupted to, in effect, provide projections which are adapted to pass through the troughs upon telescopic engagement of the head with the skirt, the ring already having been secured to the skirt. The upper faces 39 of these projections are inclined and the crests of the ring are peripherally split with the splits inclined so that the lower edges of the upper parts of the crests have a cam engagement with the projections of the head upon relative rotation of the head and ring, whereby the head and ring are longitudinally clamped together. The projections also have a cam engagement with the lower parts of the crests, which are transversely severed to form gaps 40 so that the free ends of these lower parts are cammed into firm engagement with the skirt, thereby resiliently centering the head and skirt with respect to each other. The head and skirt after assembly are adapted to be secured in fixed rotative relation to each other in the same manner as the head and skirt shown in Figures 1 to 4, inclusive.

What I claim as my invention is:

1. In a piston, the combination with head and skirt members, of means for securing said head and skirt members together, including a member having cam engagement with one of said head and skirt members upon relative rotation of said last mentioned member and said securing member.

2. In a piston, the combination with head and skirt members, of means for securing said head and skirt members together, including a member secured to one of said head and skirt members and having cam engagement with the other of the head and skirt members upon relative rotation of said last mentioned member and said securing member.

3. In a piston, the combination with head and skirt members, of a peripherally undulate ring secured to one of said members and having cam engagement with the other of said members upon relative rotation of said last mentioned member and said ring.

4. In a piston, the combination with a head member having a shoulder and a skirt member abutting said shoulder, of a sheet metal member for securing said head and skirt members together, said sheet metal member having a cam engagement with one of said head and skirt members.

5. In a piston, the combination with a head member having a shoulder and an outwardly extending flange and a skirt member having an inwardly extending flange abutting said shoulder, of means for securing said head member and skirt member to each other, including a peripherally undulate ring engaging said flanges, one of said flanges being interrupted to telescope said ring by engaging the troughs thereof.

6. In a piston, the combination with a head member having a shoulder and an outwardly extending flange and a skirt member having an inwardly extending flange abutting said shoulder, of a peripherally undulate ring abutting one of said flanges and having cam engagement with the other of said flanges upon relative rotation of said last mentioned flange and said ring, said last mentioned flange being interrupted to telescope said ring by engaging the troughs thereof.

7. In a piston, the combination with a head member having a shoulder and an outwardly extending flange and a skirt member surrounding said outwardly extending flange and having an inwardly extending flange abutting said shoulder, of a ring provided with peripherally spaced outwardly extending crests having cam engagement with said inwardly extending flange upon relative rotation of said skirt member and ring.

8. In a piston, the combination with a head member having a shoulder and an outwardly extending flange and a skirt member surrounding said outwardly extending flange and having an inwardly extending flange abutting said shoulder, of a peripherally undulate ring having the edges of its troughs abutting one of said flanges and having its crests peripherally split, each crest being provided with a part having an edge abutting the other of said flanges and with a part forced into contact with the one of said head and skirt members having the first mentioned flange.

9. In a piston, the combination with head and skirt members, of a peripherally undulate ring having one of its troughs transversely separate and having its crests provided with cam surfaces for engagement with one of said head and skirt members upon relative rotation of said last mentioned member and said ring, and a common means for securing the ends of said ring together and holding said ring from rotation relative to the other of said head and skirt members.

10. In a piston, the combination with head and skirt members, of a ring provided with portions for respectively clamping said head and skirt members together and concentrically locating the same, said portions having cam engagement with one of said head and skirt members upon relative rotation of said last mentioned member and said securing member.

In testimony whereof I affix my signature.

PHELPS M. FREER.